(12) United States Patent
Ahlquist

(10) Patent No.: US 7,441,069 B2
(45) Date of Patent: Oct. 21, 2008

(54) DEFAULT INSTRUCTION TO HIDE NONVOLATILE MEMORY CORE INITIALIZATION LATENCY

(75) Inventor: Brent Ahlquist, Loomis, CA (US)

(73) Assignee: Intel Corporation, Santa Clara, CA (US)

(*) Notice: Subject to any disclaimer, the term of this patent is extended or adjusted under 35 U.S.C. 154(b) by 220 days.

(21) Appl. No.: 11/403,742

(22) Filed: Apr. 13, 2006

(65) Prior Publication Data

US 2007/0245066 A1 Oct. 18, 2007

(51) Int. Cl.
*G06F 12/00* (2006.01)

(52) U.S. Cl. ........................................... 711/103

(58) Field of Classification Search ................. 711/103, 711/4; 365/185.29, 185.12; 714/8
See application file for complete search history.

(56) References Cited

U.S. PATENT DOCUMENTS

| | | | |
|---|---|---|---|
| 5,673,383 A * | 9/1997 | Sukegawa | |
| 6,813,191 B2 * | 11/2004 | Fujioka | 365/185.29 |
| 7,058,779 B1 * | 6/2006 | McClain | 711/170 |

* cited by examiner

*Primary Examiner*—Pierre-Michel Bataille
(74) *Attorney, Agent, or Firm*—The Law Offices of John C. Scott, LLP; John C. Scott

(57) ABSTRACT

A memory operating in an execute-in-place (XIP) type mode returns a default instruction when an nV memory core is not ready for access. The default instruction may be selected to provide a system stall when executed within a corresponding processor.

22 Claims, 2 Drawing Sheets

DEFAULT INSTRUCTION TO HIDE NONVOLATILE MEMORY CORE INITIALIZATION LATENCY

TECHNICAL FIELD

The invention relates generally to digital memory and, more particularly, to control techniques for use with nonvolatile memory having initialization latency.

BACKGROUND OF THE INVENTION

Nonvolatile (nV) memory, such as flash memory, has traditionally had a small, fixed initialization delay after power is applied or a reset operation is performed before a read operation could be carried out. Because the delay was small and predictable, it was usually tolerable within a digital system. Newer nV memory technologies, on the other hand, may include additional functionality that can increase post reset initialization delays and make them indeterminate. For example, features such as embedded security, power loss recovery, and/or others within nV memories can result in post reset delays that are not as predictable as delays in memories of the past. Techniques and structures are needed for dealing with such indeterminate delays.

DETAILED DESCRIPTION

Figure 1:
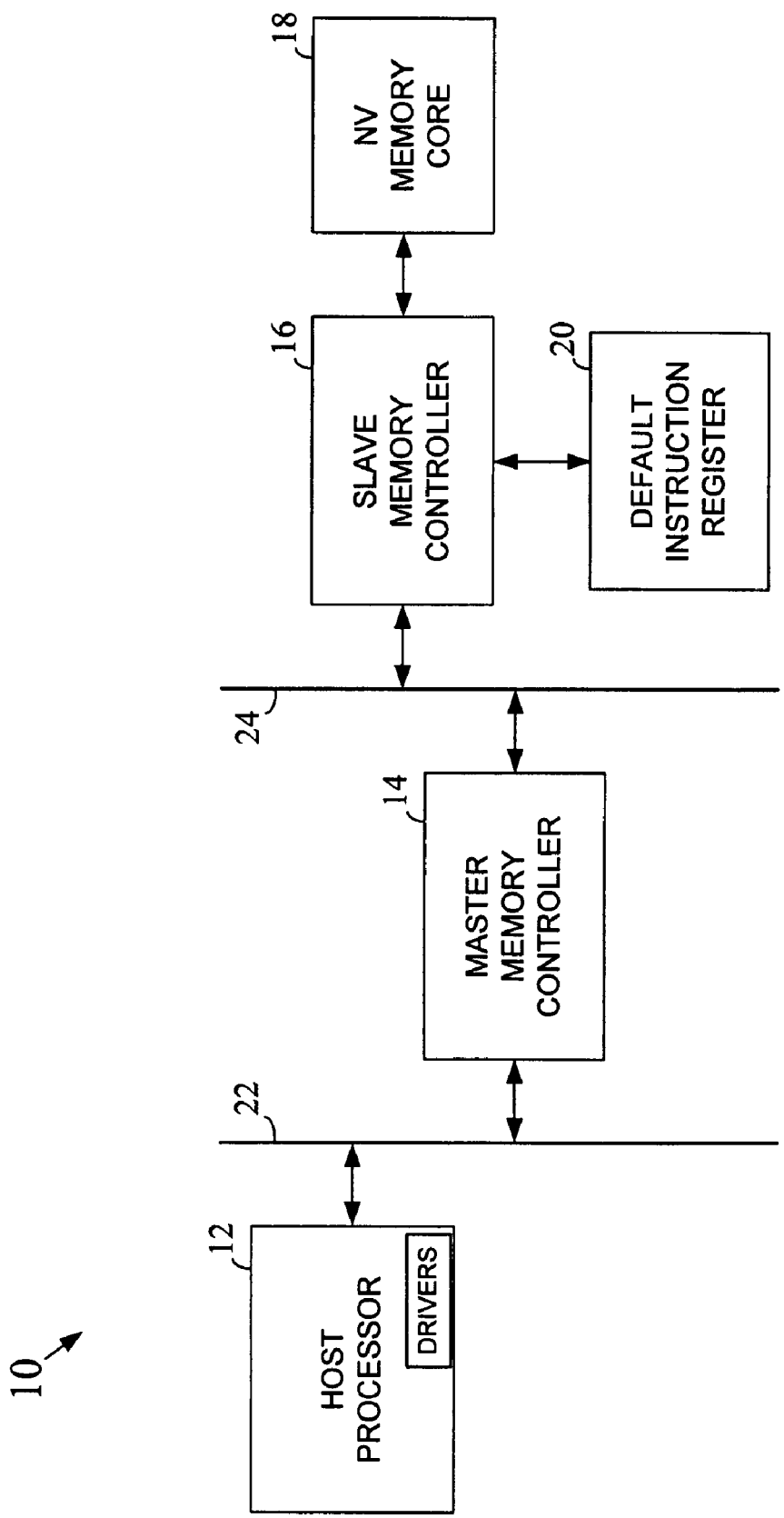
FIG. 1 is a block diagram illustrating an example computing system that may incorporate features of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a block diagram illustrating an example computing system 10 that may incorporate features of the present invention. As illustrated, the system 10 includes: a host processor 12, a master memory controller (MMC) 14, a slave memory controller (SMC) 16, a nonvolatile (nV) memory core 18, and a default instruction register 20. The host processor 12 is a digital processing device that is capable of processing programs having a series of instructions. The host processor 12 may include any of a variety of different processor types including, for example, a general purpose microprocessor, a digital signal processor (DSP), a reduced instruction set computer (RISC), a complex instruction set computer (CISC), a field programmable gate array (FPGA), and/or others. The MMC 14 provides an interface between the host processor 12 and a system memory of the computing system 10. Similarly, the SMC 16 provides an interface between the MMC 14 and a particular portion of the system memory (e.g., nV memory core 18, etc.). Although illustrated with a single SMC 16 in FIG. 1, it should be appreciated that multiple SMCs may exist within the system 10 (e.g., each connected to bus 24, etc.) to control different portions of the system memory. Each SMC may provide control for multiple different memory banks or chips. There will usually be only one MMC 14 within a system.

In the illustrated embodiment, the host processor 12 communicates address information to the MMC 14 via a first bus 22 and the MMC 14 communicates address information to the SMC 16 via a second bus 24. Other transmission structures (e.g., data busses, etc.) may be provided to carry data to/from the nV memory core 18 and other areas of memory. Other techniques and structures for providing communication between the various elements of the system 10 may alternatively be used. The host processor 12 may utilize one or more drivers to provide an interface with the MMC 14.

In at least one operational scenario, the nV memory core 18 will store instructions to be processed by the host processor 12 in an execute-in-place (XIP) type process. The host processor 12 will fetch instructions from the nV memory core 18 when needed. The MMC 14 and the SMC 16 will facilitate the retrieval of the instructions from the nV memory core 18 and the delivery of the instructions to the host processor 12 for execution. As described previously, in some cases, the nV memory core 18 may have an indeterminate post reset initialization delay. If a read operation is attempted for the nV memory core 18 during this delay, when the core 18 is not ready, an invalid instruction may be returned to the host processor 12 causing errors in the processing. In accordance with one aspect of the present invention, instead of returning an incorrect instruction to the processor 12 when the nV memory core 18 is not ready, a default instruction is returned that produces a system stall within the processor 12. When the nV memory core 18 again becomes available, the proper instruction is permitted to be retrieved and delivered to the processor 12. Because the system is merely stalled by the default instruction, the processing may pick up where it left off with little disruption to the processing task being performed.

In at least one embodiment of the invention, the functionality for retrieving the default instruction when the nV memory core 18 is not available is located within the SMC 16. In other embodiments, other locations may be used (e.g., the MMC 14, etc.). Referring back to FIG. 1, the default instruction register 20 is a memory location (or locations) that may be used to store the default instruction for use when the nV memory core 18 is not available. The SMC 16 may keep track of the current status of the nV memory core 18 so that it knows when the core 18 is available or unavailable. The SMC 16 may know, for example, that a security related operation (or some other type of operation) is presently being performed for the nV memory core 18 that does not permit access operations to be concurrently performed. Therefore, if a read operation is required for the nV memory core 18 during this time, the SMC 16 may instead retrieve the default instruction from the default instruction register 20 and return this to the host processor 12. After the default instruction has been returned, the SMC 16 will again have to make a determination of whether the nV memory core 18 is available and, if not, return the default instruction again to the host processor 12. If the nV memory core 18 is available at this time, however, the SMC 16 may retrieve the actual, desired instruction from the nV memory core 18 and return this to the host 12.

The default instruction register 20 may be any type of memory location that will be accessible when the nV memory core 18 is not ready for access. For example, the register 20 may be a discrete register chip, a part of a larger read only memory (ROM), a part of another nV memory, a part of a random access memory (RAM), or some other type of memory or storage. In at least one embodiment, the default instruction register 20 is part of the nV memory core 18. In some newer nV memory chips, for example, partitioning schemes are used that allow some nV ranges to be written while others are being read. One such range (e.g., a redundant block) may be used as an "always accessible" partition to hold the microcode that manages the initialization process. The default instruction(s) may be stored within this "always accessible" partition. The default instruction(s) may be executed directly from the "always accessible" partition or they may be transferred to a register during the start of the initialization process. The default instruction(s) can also be stored in an "always accessible" partition of the nV memory even if the microcode that manages the initialization process is stored elsewhere. The nV memory core 18 may include any type of nV memory including, for example, flash memory, erasable programmable ROMs (EPROMs), electrically erasable programmable ROMs (EEPROMs), and/or others. In at least one embodiment, the nV memory core 18 is a flash memory that uses NOR technology.

The default instruction that is sent to the host processor 12 may be any instruction, or series of instructions, that is capable of producing a system stall. The default instruction (or series of instructions) that is used will typically depend upon the particular processor being used. For example, the default instruction may be selected from the instruction set of the processor being used. In at least one embodiment, for example, a "Branch Relative 0" instruction is used as the default instruction. This instruction (or something like it) is available within the instruction set of most digital processors. Other default instructions that may be used include, for example, instructions that approximate a Branch Relative 0 (e.g., Add 0,r1, Jump r1, etc.); instructions that with foreknowledge of the system behavior can be substituted and cause desired effects (e.g., Illegal Instruction, Handler Routine, Configuration Instructions, Branch to & BOOT, etc.); and/or others. The default instruction that is used may be a customizable parameter of an nV memory subsystem. This would allow a system integrator, for example, to select a default instruction based on knowledge of the instruction set of the processor with which the nV memory will be used.

The size, content, and number of memory accesses required to retrieve the default instruction may be based upon the system architecture. For example, some instruction sets may have instruction lengths that are larger than the read port of the default instruction register 20. In such a case, multiple memory accesses may be required to retrieve the default instruction from the register 20. To accommodate the variability in instruction size, the number of accesses that will be performed to retrieve the default instruction (or series of instructions) may be a programmed parameter of the nV memory system. In at least one embodiment, one-time-programming (OTP) bits within a memory may be used to hold default instruction data and access count (e.g., maxcount) information. Other techniques for programming a maxcount value may alternatively be used.

When a maxcount value has been programmed, the value can be used during the retrieval of the default instruction as follows. When the nV memory core is not ready for access (e.g., it is still initiating), a first portion of the default instruction (say, default_instruction[0]) may be retrieved during a first access and a word index initialized to 1. Each successive access may then increment the word index by 1 until default_instruction[maxcount] is read by the host. If the initialization delay of the nV memory core has not completed by the time default_instruction[maxcount] is read, the word index may be reset and the default instruction retrieved again. If the initialization has completed by the time default_instruction[maxcount] is read, then the desired instruction may be retrieved for the host from the nV core.

It should be appreciated that the computing system 10 of FIG. 1 is merely illustrative of one example of a system architecture that may incorporate features of the present invention. Other system architectures could alternatively be used. For example, in one alternative embodiment, there may be only a single memory controller for a system and that controller may include the default instruction fetching functionality. In some embodiments, the master memory controller may be part of the same package as the host processor, while in other embodiments the master memory controller is separate from the processor (e.g., mounted on the same motherboard as the processor, etc.). Similarly, in some embodiments, the nV memory core could be on the same chip as the slave memory controller and the default instruction register, while in other embodiments separate components may be used. As will be appreciated, many other configurations are also possible. In various embodiments, features of the invention may be implemented using hardware, software, firmware, and/or hybrid techniques.

Figure 2:
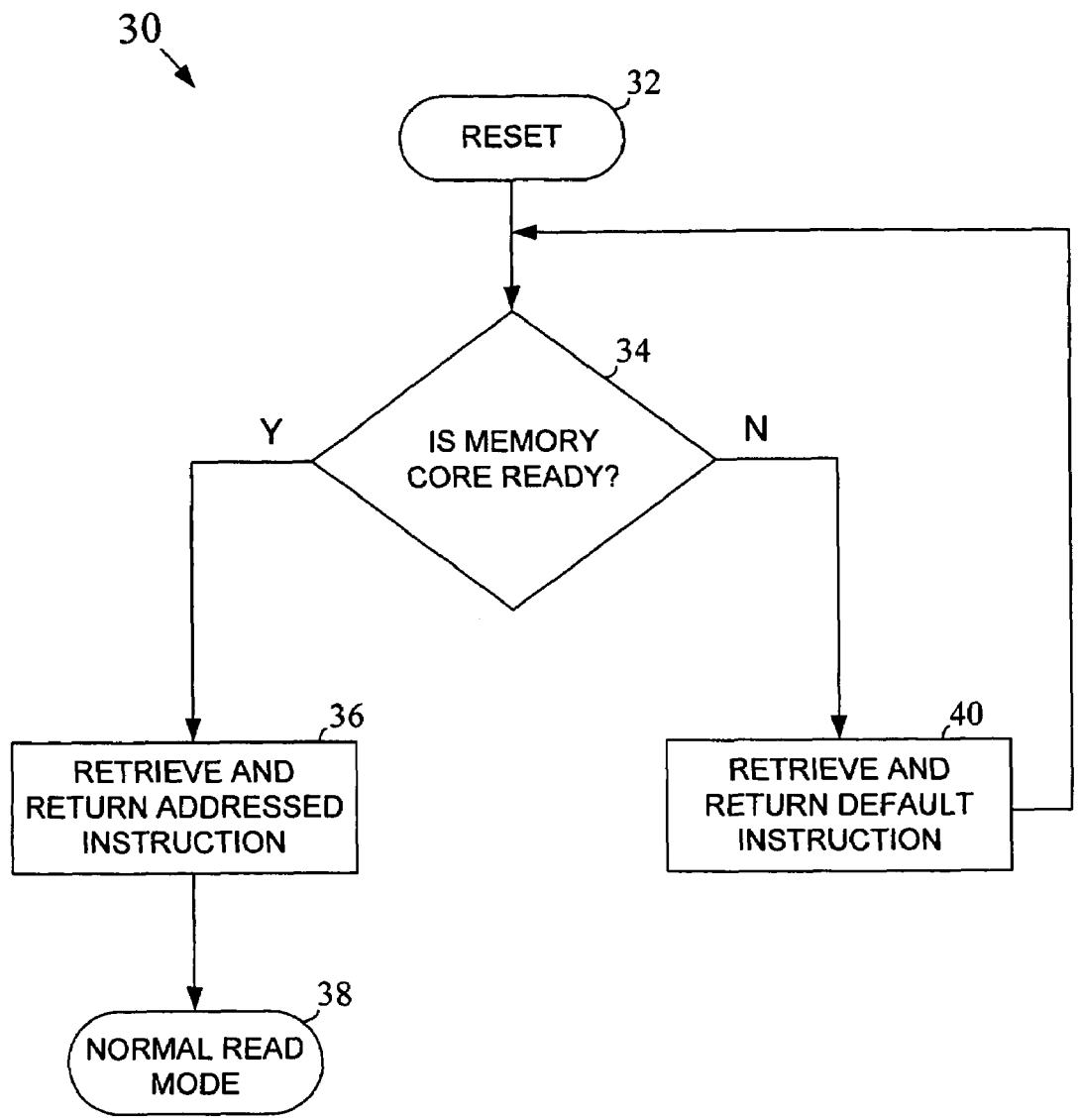
FIG. 2 is a block diagram illustrating an example method for use in fetching an instruction from a nV memory for execution within a processor in accordance with an embodiment of the present invention.

FIG. 2 is a flowchart illustrating an example method 30 for use in fetching an instruction from a nV memory for execution within a processor in accordance with an embodiment of the present invention. The method 30 may be implemented in connection with computing system 10 of FIG. 1 and/or other systems. First, an nV memory is reset to prepare the memory for a subsequent read operation (block 32). As described previously, the reset may result in an indeterminate post reset delay before the nV memory is ready to be accessed. After the reset, it may next be determined whether the memory core is ready for access (block 34). If, for example, a security related function or data protection function is still being performed at this time, it may be presumed that the nV memory core is not ready for access. Other conditions may also, or alternatively, be used as an indicator of the readiness of the nV memory. If the nV memory core is ready, the addressed instruction may be retrieved from the core and delivered to the processor for execution (block 36). The memory system may then enter a normal read mode (block 38). If the core is not ready at this point, on the other hand, the default instruction (or series of instructions) may be retrieved and delivered to the processor for execution (block 40). The method 30 may then return to block 34 to again determine whether the nV memory core is ready to be accessed. If the core is still not ready, the default instruction may be retrieved and returned again (block 40). This may then be repeated until the nV memory core becomes ready, at which time the desired instruction may be accessed and returned.

The techniques and structures of the present invention may be implemented in any of a variety of different forms. For example, features of the invention may be embodied within laptop, palmtop, desktop, and tablet computers; personal digital assistants (PDAs); cellular telephones and other handheld wireless communicators; pagers; satellite communicators; cameras; audio/video equipment; network interface cards (NICs) and other network interface structures; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data. As used herein, the term "logic" may include, by way of example, software or hardware and/or combinations of software and hardware.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A computer implemented method comprising:
determining that an instruction needs to be retrieved from a nonvolatile (nV) memory for execution in a processor;
determining whether said nV memory is currently ready for access;
retrieving said instruction from said nV memory and delivering said instruction to the processor when said nV memory is currently ready for access;
retrieving a default instruction from a memory and delivering said default instruction to the processor when said nV memory is not currently ready for access; and
after retrieving said default instruction, repeating:
determining whether said nV memory is currently ready for access;
retrieving said instruction from said nV memory and delivering said instruction to the processor when said nV memory is currently ready for access; and
retrieving a default instruction from a memory and delivering said default instruction to the processor when said nV memory is not currently ready for access.

2. The method of claim 1, wherein:
said nV memory includes flash memory.

3. The method of claim 1, wherein:
said default instruction is to produce a system stall when executed in said processor.

4. The method of claim 1, wherein:
said default instruction is a "branch relative zero" instruction.

5. The method of claim 1, wherein:
retrieving a default instruction from a memory requires multiple accesses to said memory.

6. The method of claim 1, wherein:
retrieving a default instruction includes retrieving a series of instructions.

7. The method of claim 1, wherein:
said memory storing said default instruction is different from said nV memory.

8. An apparatus comprising:
a nonvolatile (nV) memory core to store instructions to be executed by a processor; and
a memory controller to control operation of said nV memory core, said memory controller to: determine that an instruction needs to be retrieved from said nV memory core, retrieve said instruction from said nV memory core and deliver said instruction to the processor when said nV memory core is currently ready to be accessed, retrieve a default instruction from a memory and deliver said default instruction to said processor when said nV memory core is not currently ready to be accessed; and after retrieving said default instruction: (i) again determine whether said nV memory is currently ready for access; (ii) again retrieve said instruction from said nV memory and deliver said instruction to the processor when said nV memory is currently ready for access; and (iii) again retrieve a default instruction from a memory and deliver said default instruction to the processor when said nV memory is not currently ready for access.

9. The apparatus of claim 8, wherein:
said memory is different from said nV memory core.

10. The apparatus of claim 8, wherein:
said memory controller is a slave memory controller.

11. The apparatus of claim 8, wherein:
said default instruction is to produce a system stall when executed in said processor.

12. The apparatus of claim 8, wherein:
said default instruction is a "branch relative zero" instruction.

13. The apparatus of claim 8, wherein:
said default instruction includes a series of instructions.

14. The apparatus of claim 8, wherein:
said nV memory core includes flash memory.

15. A system comprising:
a digital signal processor (DSP);
a nonvolatile (nV) memory core to store instructions to be executed by said DSP; and
a memory controller to control operation of said nV memory core, said memory controller to: determine that an instruction needs to be retrieved from said nV memory core, retrieve said instruction from said nV memory core and deliver said instruction to said DSP when said nV memory core is currently ready to be accessed, and retrieve a default instruction from a memory and deliver said default instruction to said DSP when said nV memory core is not currently ready to be accessed; and after retrieving said default instruction: (i) again determine whether said nV memory is currently ready for access; (ii) again retrieve said instruction from said nV memory and deliver said instruction to said DSP when said nV memory is currently ready for access; and (iii) again retrieve a default instruction from a memory and deliver said default instruction to said DSP when said nV memory is not currently ready for access.

16. The system of claim 15, wherein:
said default instruction is to produce a system stall when executed in said DSP.

17. The system of claim 15, wherein:
said default instruction is a "branch relative zero" instruction.

18. The system of claim 15, wherein:
said default instruction includes a series of instructions.

19. An article comprising a computer readable storage medium having instructions stored thereon that, when executed by a computing platform, operate to:
- detect that an instruction needs to be retrieved from a nonvolatile (nV) memory for execution in a processor;
- determine whether said nV memory is currently ready for access;
- retrieve said instruction from said nV memory and deliver said instruction to the processor when said nV memory is currently ready for access;
- retrieve a default instruction from a memory and deliver said default instruction to the processor when said nV memory is not currently ready for access; and
- after retrieving said default instruction: (i) again determine whether said nV memory is currently ready for access; (ii) again retrieve said instruction from said nV memory and deliver said instruction to the processor when said nV memory is currently ready for access; and (iii) again retrieve a default instruction from a memory and deliver said default instruction to the processor when said nV memory is not currently ready for access.

20. The article of claim 19, wherein:
said default instruction is to produce a system stall when executed in said processor.

21. The article of claim 19, wherein:
said default instruction is a "branch relative zero" instruction.

22. The article of claim 19, wherein:
said default instruction is a series of instructions.

* * * * *